Nov. 16, 1965     K. W. STALKER     3,217,554
UNIVERSAL PULLEY

Filed June 13, 1963            2 Sheets-Sheet 2

INVENTOR.
Kenneth W. Stalker,
BY Parker & Carter
Attorneys.

United States Patent Office 3,217,554
Patented Nov. 16, 1965

3,217,554
UNIVERSAL PULLEY
Kenneth W. Stalker, Western Springs, Ill., assignor to Goodman Manufacturing Company, Chicago, Ill., a corporation of Illinois
Filed June 13, 1963, Ser. No. 287,602
5 Claims. (Cl. 74—230.3)

This invention relates generally to belt conveyors, and particularly to a new pulley which is suitable for a plurality of applications in a belt conveyor.

Flexible conveyors, such as those illustrated in the Craggs et al. Patent No. 2,773,257, employ a number of belt contacting pulleys, each of which is designed to do a different job. Every flexible belt conveyor includes a head pulley, a tail pulley, and at least one drive pulley. In addition, more drive pulleys may be provided and frequently snubbing pulleys are used to insure better belt wrap around the drive pulleys or provide clearance over some other portion of the conveyor. Heretofore it has been virtually impossible to standardize belt pulleys to any appreciable degree. This has been so even though a given diameter pulley might be sufficient to handle two or even more belt widths, for example. Because of the virtual uniqueness of each pulley it has not been feasible to stock a number of interchangeable pulley parts. As a result, assembly and delivery time from a manufacturer to a customer was necessarily slow, and each pulley was rather expensive since each amounted, in effect, to a special order.

In use certain disadvantages occasionally show up on most of the conventional prior art pulleys. One frequent defect is the loosening of the shell from the shaft. Generally the shell and shaft are two separate pieces connected together. These pieces are always subjected to high stresses. These high stresses have conventionally been compensated for by beefing up the pulley components. The result is a very heavy pulley with a rather low strength-to-weight ratio which is hard to handle and install, and expensive to fabricate and ship.

Accordingly a primary object of this invention is to provide a pulley which is of simple construction, easily fabricated, and extremely lightweight as contrasted to conventional pulleys of similar diameter and length and which can be employed as a drive pulley, a head or tail pulley, or a snubbing pulley.

Another object is to provide a universal pulley composed of a minimum of different sized parts so that many sizes of pulleys can be fabricated from a small number of interchangeable, easily stocked parts.

Yet a further object is to provide a pulley which is fabricated from a minimum number of inter-related parts which is lightweight and has a very high strength-to-weight ratio due to the optimum arrangement of its structural components.

Yet a further object is to provide a pulley of wide application in which slippage between the shaft and belt is virtually eliminated.

Another object is to provide a universal pulley in which only a portion of the roller shell functions as a force, and specifically a torque, transmitting member, thereby eliminating the necessity of a through shaft.

Other objects and advantages of the invention will become apparent upon reading the following description of the invention.

The invention is illustrated more or less diagrammatically in accompanying drawings wherein.

Like reference numerals will refer to like parts throughout the following description of the drawing.

Figure 1:
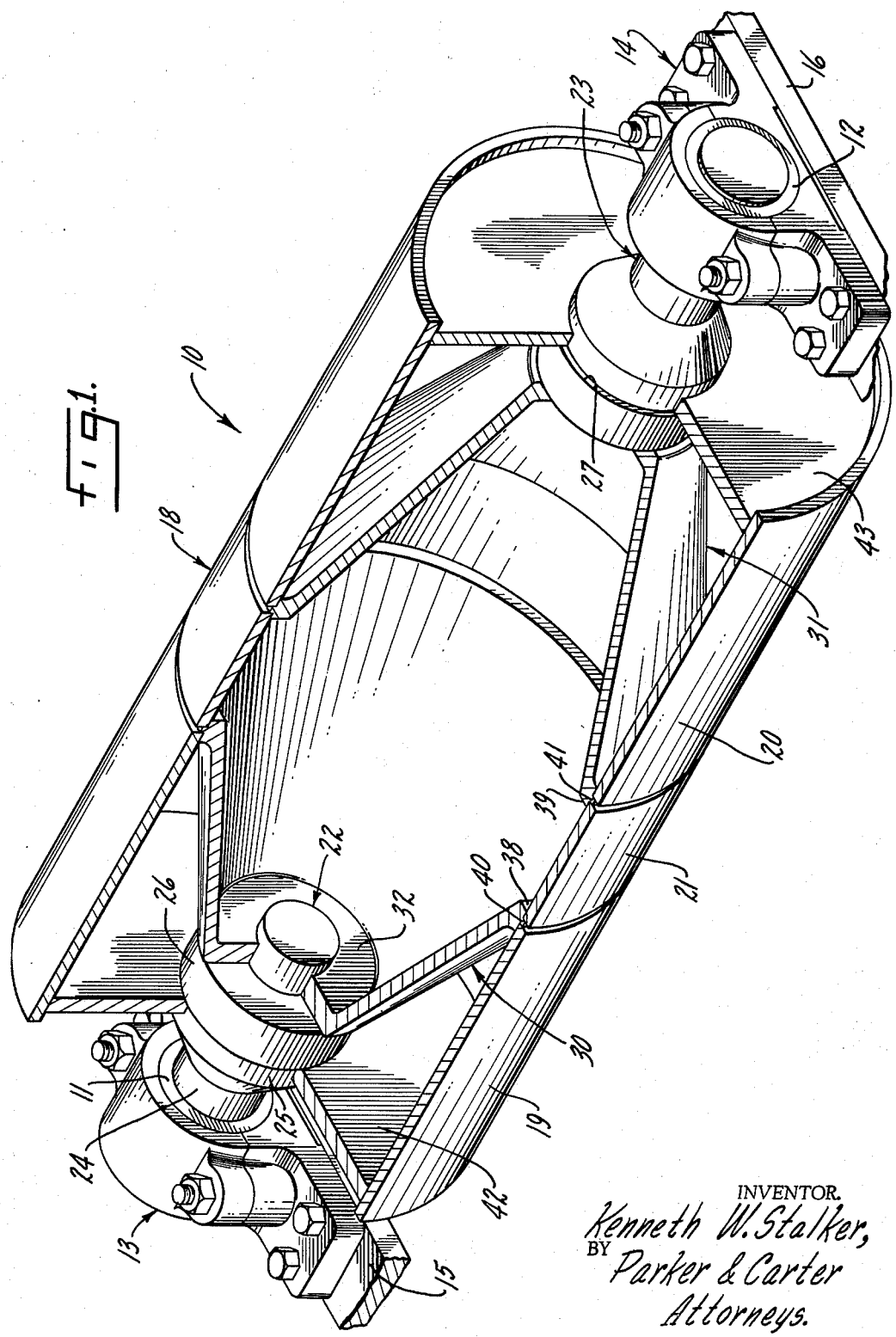
FIGURE 1 is a perspective view with a section removed of the preferred embodiment of the invention.

The pulley, which is indicated generally at 10 in FIGURE 1, is supported by a pair of shaft end bearings 11 and 12, the bearings in turn being carried by pillow block structures 13 and 14 respectively. The pillow block structures in turn are bolted to a pair of bases 15 and 16 which may for example be sections of a sideframe in a flexible belt conveyor of a type illustrated in the Craggs et al. Patent 2,773,257.

The pulley consists of a shell indicated generally at 18 in FIGURE 1. In this instance the shell consists of two end portions 19 and 20 which flank a midportion or intermediate section 21. The mid-section 21 is considerably shorter than either of the end portions 19 and 20, but it is quite within the scope of the invention to either dispense with the mid-section altogether or utilize one whose length is considerably greater, or shorter, than that shown.

Shaft means are indicated generally at 22 and 23. Each shaft means is identical and only one will be described. Shaft means 22 consists of a small diameter shaft section 24 which is received in bearing 11 of pillow block 13. The diameter of the shaft 24 increases in an axially inward direction along a portion 24a (see FIGURE 2) to a uniform diameter portion 25. A further inwardly extending portion 26 of slightly larger diameter is offset from portion 25 by a shoulder 27, shown best in connection with shaft means 23. The innermost end 28 of the shaft means is of a substantially smaller diameter than portion 26. In the illustrated embodiment the shaft means have been illustrated as made from one solid piece of material, the various diameters being turned. This is not necessary and it may be desired in some instances to fabricate the shaft means from separate parts. In any event however the differing diameter portions or sections of the shaft means may be considered as an integral unit.

A pair of generally conic shaped internal members are indicated generally at 30 and 31. The smaller end portions 32 and 33 of the conic members are flat and each has a center aperture indicated at 34 and 35 respectively. The center apertures are of a size sufficient to receive the small diameter portions 28 of the shaft means, and the parts are welded to one another at 36 and 37. Again, although welds have been illustrated it will at once be apparent that other suitable means may be employed to rigidly connect the conic sections to the inner shaft portions 28.

The larger end portions of the conic members 30, 31 terminate in flanges 38 and 39 respectively. Each flange has a circular ridge 40 or 41 extending about its periphery, each ridge forming on its axially outer side a notch for the reception of the inner edge of the end portions 19 and 20 of the roller shell. Preferably the ridges 40 and 41 do not extend radially outwardly as far as the outer surface of the end portions 19 and 20 to provide a depression within which weld material can be deposited. The inner edges of the ridges 40 and 41 form shoulders against which the ends of mid-section 21 are abutted and welded as best shown in FIGURE 1.

Figure 2:
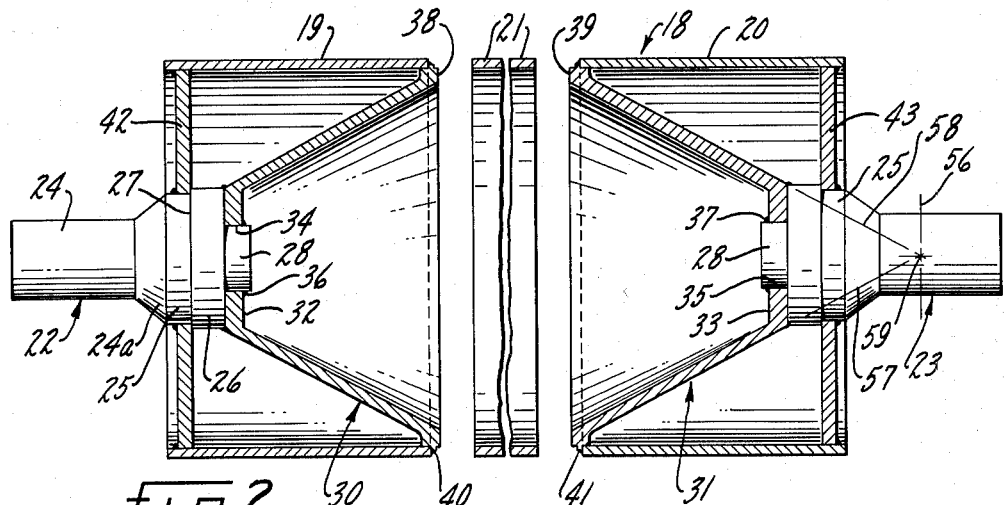
FIGURE 2 is an exploded sectional view with parts omitted for clarity of the preferred embodiment of the invention.

In FIGURE 1 the mid-section 21 is shown as of a fixed length. In FIGURE 2 the mid-section is shown discontinuous to indicate that it may vary in length.

A pair of annular end plates 42 and 43 are welded at their outer extremities to the adjacent inside surfaces of end portions 19 and 20. Sections 25 of the shaft means are received in center holes of the end plates and welded thereto as best seen in FIGURE 2.

Figure 3:
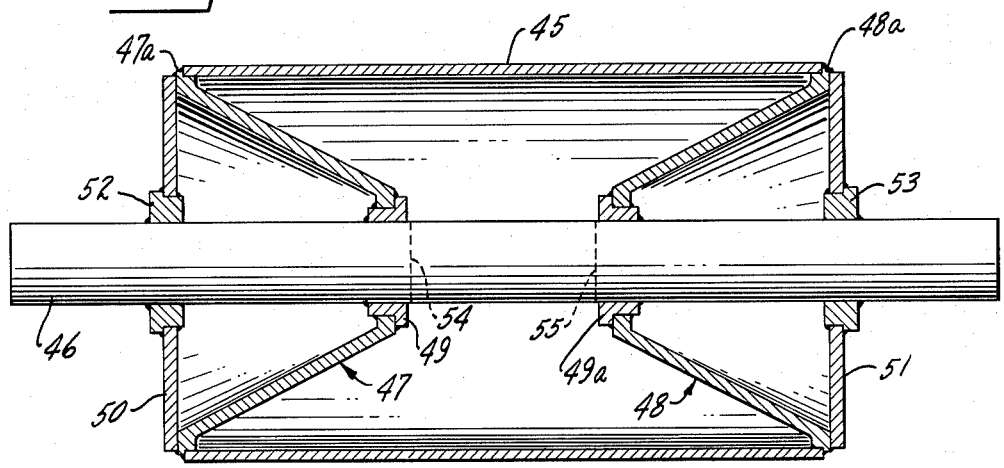
FIGURE 3 is a section through another embodiment of the invention.

In the FIGURE 3 embodiment the shell 45 is continuous from end to end. A through shaft, which may be a drive shaft, is indicated at 46. In this instance the shell is supported from the shaft by generally conic shaped members 47 and 48 whose end portions are reversed as contrasted with the position of the conic sections 30 and 31 in the embodiment of FIGURES 1 and 2. Further, in the FIGURE 3 embodiment, the smaller or inner end portions of the conic members are composed of a pair of bushings 49 and 49a which are welded to the smaller end portions of the conic members. The bushings in turn are welded to shaft 46 so that the shell and shaft rotate together.

Annular end plates 50 and 51 are welded to the outer flat surfaces on the larger end portions of the conic members 47 and 48. In this instance the end members are welded directly to the conic members rather than to the shell as in the embodiment of FIGURES 1 and 2. The annular end plates are welded to bearing rings 52 and 53 respectively, the rings in turn being welded to the shaft 46. The shaft is thereby given a four point support.

Alternately, the shaft means may be discontinuous. In this event the inner ends of the two shafts are indicated at 54 and 55.

It should also be understood that it is quite within the scope of the invention to extend or contract the length of shell 45 to any desired dimension. It could be considerably longer than shown in FIGURE 3 or it may be shortened to the point where the bushings 49 and 49a are in abutting engagement. In this latter event it may be desirable to utilize a ring in place of the separate bushings, the smaller diameter ends of the conic members being affixed to the ring.

It should also be understood that it is quite within the scope of the invention to place the conic members inwardly from the extremities of the shell with the inner end portions in abutting or spaced relation to one another. That is, the annular plates 50, 51 would be welded to the shell 45 and the large ends of the conic members 47 and 48 would be spaced longitudinally inwardly. In this event the projecting ridges 47a and 48a would be omitted since the greater diameter of the conic members would have to be no greater than the internal diameter of the shell 45.

The use and operation of the invention are as follows:

Referring first to the embodiment of FIGURES 1 and 2, the pulley is first fabricated to any desired length. It will be understood that in the coal mining equipment industry for example there are several fairly well standardized belt widths and therefore fairly well standardized pulley lengths for use with each width. For example, with 30, 36, 42 and 48 inch belting, pulley lengths are frequently matched at 36, 42, 48 and 54 inches, respectively. With an increase in the width of belt an increase in horsepower is usually called for since the wider the belt the heavier the loads it will be carrying. It is well established that the greater the horsepower the greater the diameter of pulley is required in order to provide adequate belt wrap and for other reasons well known in the art.

As a practical matter, it may be possible to use only two pulley diameters for the four above exemplary belt widths. For example, a 50 horsepower motor may provide adequate power for a 30 and 36 inch belt passing around pulleys of equal diameter, preferably a 42 inch pulley of approximately a 19 inch diameter. A 75 horsepower motor may provide adequate power for a 42 and 48 inch belt passing around pulleys of equal diameter, preferably a 54 inch pulley of about a 21 inch diameter.

It will be understood that the above figures are exemplary only and the pulley diameter in any particular application may vary due to length and spread of the conveyor belt.

With the above described construction, a pulley of a given diameter can be made to longer or shorter lengths at will within the capacity of the driving means utilizing the same basic pulley components except for the mid-section 21. That is, for a 30" belt for example end portions 19 and 20 can be made up into 18" lengths and the ends of conic members 30, 31 butted against one another to form a 36 inch long pulley. For a 36 inch belt a mid-portion 21 of 6" in width can be welded to flanges 38 and 39 of stock conic members 30 and 31. Shaft means 22, 23, conic sections 30, 31 and pulley end portions 19, 20 are identical in both the 36 inch and 42 inch long pulleys.

Thus, a variety of pulley sizes may be made up from identical, interchangeable parts, the only part varying in size being the mid-section 21. Since the mid-section is tubular, it can be stocked in indeterminate lengths and merely cut to size prior to placement in the middle of the shell.

In the embodiment of FIGURE 3, the end sections, which consist of conic members 47, 48, annular end plates 50, 51, and bushings 49, 49a, 52 and 53, will be identical for varying length pulleys. So long as the horsepower requirements do not dictate a large diameter pulley, the length of the pulley is determined solely by the length of shell 45. Again, shell 45 may be cut from tubular stock of indeterminate length to any desired length.

The length of shaft 46 will also vary according to the length of the shell 45 but shafts can be stocked in standard sizes or cut from indeterminate lengths.

Alternately, any variation in the length of the shaft means can be eliminated by forming the end sections of the pulley as identical sections. That is, each section would include a conic member, an annular end plate and a pair of bushings, the bushings being welded to a stub shaft whose inner ends are indicated at 54 or 55 for example. When the shaft is discontinuous the only part which varies from pulley to pulley is the length of shell 45.

One tremendous advantage of the above-described construction, and particularly the embodiment of FIGURES 1 and 2, is that an extremely high strength-to-weight ratio is achieved. Referring to FIGURE 2 for example the center line of bearing 12 is indicated at 56. As the pulley rotates, the various components are subjected to bending moments. In a conventional construction the torque, and the additional bending moments created by the torque and the tension of the belt, are transmitted through the end walls 42 and 43 to the pulley shell. Now, the line of minimum bending moments between the center line 56 of the bearing means and the shell in a conventional pulley does not fall along a path defined by the end walls 42, 43 and pulley shell end portions 19 and 20. Since these parts are disposed a substantial distance away from the line of minimum bending moments, the bending moments which the parts must carry are greatly increased. Accordingly, the parts must be made heavier to accommodate the increased bending moments.

With the above described construction, however, conic members 30 and 31 serve as the force transmitting members between the shaft and bearing means and pulley shell 18 or 45. The applied load on the shell is carried through the conic members to the bearings by the material of the conic members. There are no unsupported bending moments, and as a result fatigue failures are reduced to a minimum.

It should also be noted that the line of minimum bending moments will extend outwardly from bearing center line 56 along paths indicated generally at 57 and 58. The walls of the conic members 30, 31 are generally aligned with these paths, thus making maximum use of the inherent strength of the conic member material. The lines of minimum bending moments are generally parabolic in shape from point 59 but the illustrated construction is about as close to these lines of minimum bending moments as it is practical to achieve.

The overall weight of the pulley can be very considerably reduced by forming the conic members 30, 31 and 47, 48 from roll-formed steel. In roll-forming a circular disc to the illustrated shape, the metal is displaced by a combination of shearing and bending forces with the end result that a considerably greater strength is imparted to such a conic section as contrasted to one which is cast or machined for example. It is therefore preferable that the conic sections be roll-formed rather than cast, machined or formed by other conventional methods.

Although a preferred and alternate embodiment of the invention has been illustrated and described, and other embodiments have been further described, it will at once be apparent to those skilled in the art that further modifications may be made within the spirit of the invention. It is accordingly the intention that the scope of the invention be limited not by the scope of the foregoing exemplary description but only by the scope of the hereafter appended claims.

I claim:
1. A high strength-to-weight pulley for a belt conveyor comprising:
   an outer tubular shell;
   shaft means concentric with, and extending beyond the ends of the shell;
   said shaft means including a hub fixedly formed therewith, said hub having an expanded portion which narrows to the shaft diameter in an axially outward directtion;
   structural members for furnishing primary support for the shell from the shaft means,
   said primary support members comprising a pair of generally cone-shaped bending moment transmitting members arranged within the shell and generally coaxially with the shaft means,
   said primary support members having their apex portions supported by the shaft means and their base portions in supporting relation with the shell,
   said apex portion of each cone-shaped bending moment transmitting member being located axially inwardly and radially outwardly with respect to the shaft axis from the point of intersection of the tapered portion of the hub with the shaft,
   said cone-shaped bending moment transmitting members being roll formed, and
   a pair of secondary support members disposed at the ends of the shell and means for supporting said secondary support members on the shaft means externally of the apex portions of the cone-shaped primary support members.

2. The high strength-to-weight pulley for a belt conveyor of claim 1 further characterized in that
   the outer tubular shell consists of a center section disposed between the generally cone-shaped bending moment transmitting members,
   said center section having the same external diameter as those portions of the tubular shell which are coaxial with the cone-shaped bending moment transmitting members,
   whereby a pulley of a desired length may be formed.

3. The high strength-to-weight pulley for a belt conveyor of claim 2 further characterized in that the shaft means are a pair of discontinuous stub shafts.

4. A high strength-to-weight heavy duty belt conveyor pulley, said heavy duty pulley comprising
   a shell,
   shaft means concentric with, and extending beyond the ends of the shell, and
   minimum weight primary support members for transferring bending moment stresses from the shell to the shaft means,
   said minimum weight primary support members comprising a pair of bending moment transmitting members,
   said bending moment transmitting members being disposed substantially entirely within the shell and arranged generally coaxially with the shaft means,
   said bending moment transmitting members having apex portions supported by the shaft means and base portions in supporting relation with the shell,
   those portions of the bending moment transmitting members between the apex and base portions thereof being substantially coincident with the line of minimum bending moments from the shell to the area of termination of the bending moments at the shaft means, and
   a pair of secondary support members, one at each end of the shell and extending from the shaft means into supporting relation with the shell.

5. The high strength-to-weight ratio heavy duty belt conveyor pulley of claim 4 further characterized in that the shaft means includes a pair of shaft members, one at each end of the shell, the inner ends of said shaft members being spaced from one another.

References Cited by the Examiner
UNITED STATES PATENTS

| | | | |
|---|---|---|---|
| 1,609,377 | 12/1926 | Millspaugh | 74—230.3 |
| 2,692,773 | 10/1954 | Lorig. | |
| 2,767,590 | 10/1956 | Currier | 74—230.3 |
| 3,005,357 | 10/1961 | Christian | 74—230.01 XR |
| 3,074,288 | 1/1963 | Newton | 74—230.3 |

DON A. WAITE, *Primary Examiner.*